July 7, 1970

C. O. JORGENSEN

3,518,983

ARRHYTHMIA DETECTOR AND METHOD OF OPERATION

Filed Oct. 3, 1967

INVENTOR
CLINTON O. JORGENSEN

BY Burns Doane Benedict Swecker & Mathis
ATTORNEYS

July 7, 1970        C. O. JORGENSEN        3,518,983

ARRHYTHMIA DETECTOR AND METHOD OF OPERATION

Filed Oct. 3, 1967        7 Sheets-Sheet 2

INVENTOR
CLINTON O. JORGENSEN
BY
Burns Doane Benedict Swecker & Mathis
ATTORNEYS

INVENTOR
CLINTON O. JORGENSEN

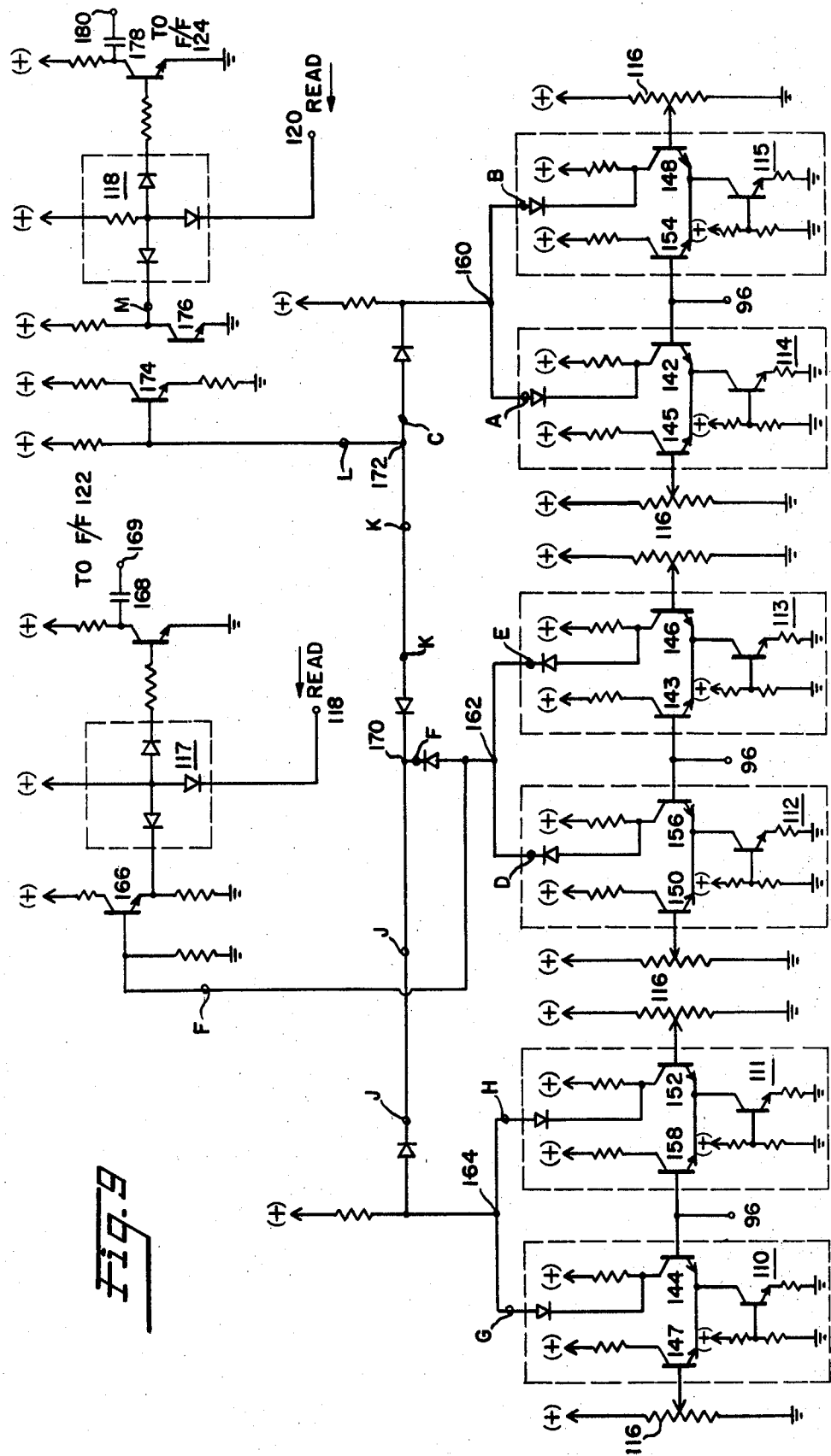

United States Patent Office 3,518,983
Patented July 7, 1970

3,518,983
ARRHYTHMIA DETECTOR AND METHOD OF OPERATION
Clinton O. Jorgensen, South Ogden, Utah, assignor, by mesne assignments, to Humetrics Corporation, a corporation of Delaware
Filed Oct. 3, 1967, Ser. No. 672,601
Int. Cl. A61f 5/04
U.S. Cl. 128—2.06                25 Claims

ABSTRACT OF THE DISCLOSURE

The simultaneous charging of a first capacitor and the discharging of a second capacitor during a cardiac cycle and the discharging of the first capacitor and the charging of the second capacitor during a subsequent cardiac cycle, the potential remaining on the capacitors at the end of the discharging cycle being used as an indication of cardiac arrhythmia.

BACKGROUND OF THE INVENTION

This invention relates to a method and apparatus for automatically determing cardiac arryhthmia and more particularly to a method and apparatus for automatically and precisely indicating the degree of arrhythmia, i.e., the lack of rhythm in an electrical signal representative of cardiac activity.

The inventive method and apparatus are particularly useful in rapidly screening individuals as well as large numbers of patients and is particularly adapted for use in the automatic screening of electrocardiograph signals disclosed in copending application Ser. No. 500,122, filed Oct. 21, 1965 by myself and others. The present invention is not however limited to the previously mentioned system but is applicable to indicate arrhythmia in cardiac activity as represented by any electrical signal however derived.

Detection of an abnormal rhythm in the heart beat by current procedures is a difficult and time-consuming task requiring concentrated and protected attention on the part of the physician. Arrhythmia has heretofore been detected by the mental timing by the physician of the heart beat as detected through a stethoscope or by reference to an electrocardiogram tracing.

It is accordingly an object of the present invention to provide a method and apparatus for indicating the degree of arrhythmia of cardiac activity.

Another object is to provide a method and apparatus for automatically and rapidly screening the cardiac activity of patients and for indicating any abnormality in the rhythm thereof.

Another object is to provide a method and apparatus which is compatible with any electrical signal representing cardiac activity irrespective of the manner in which derived.

Still another object of this invention is to provide a method and apparatus wherein the duration of each cardiac cycle is compared with only the preceding cardiac cycle as and indication of arrhythmia.

A still further object is to provide a method and apparatus wherein each cardiac cycle becomes the standard for the next successive cardiac cycle in indicating the degree of arrhythmia.

Other objects and features of the present invention will be apparent to one skilled in the art to which the invention pertains from a reading of the following description of a preferred embodiment in connection with a perusal of the accompanying drawings.

THE DRAWINGS

FIG. 8 is a table showing the relationship of the outputs of the level detectors and the enabling of the specific arrhythmia indicators; and FIG. 9 is a schematic diagram of the level detector and gating circuits shown in block form in FIG. 6.

THE PREFERRED EMBODIMENT

Figure 1:
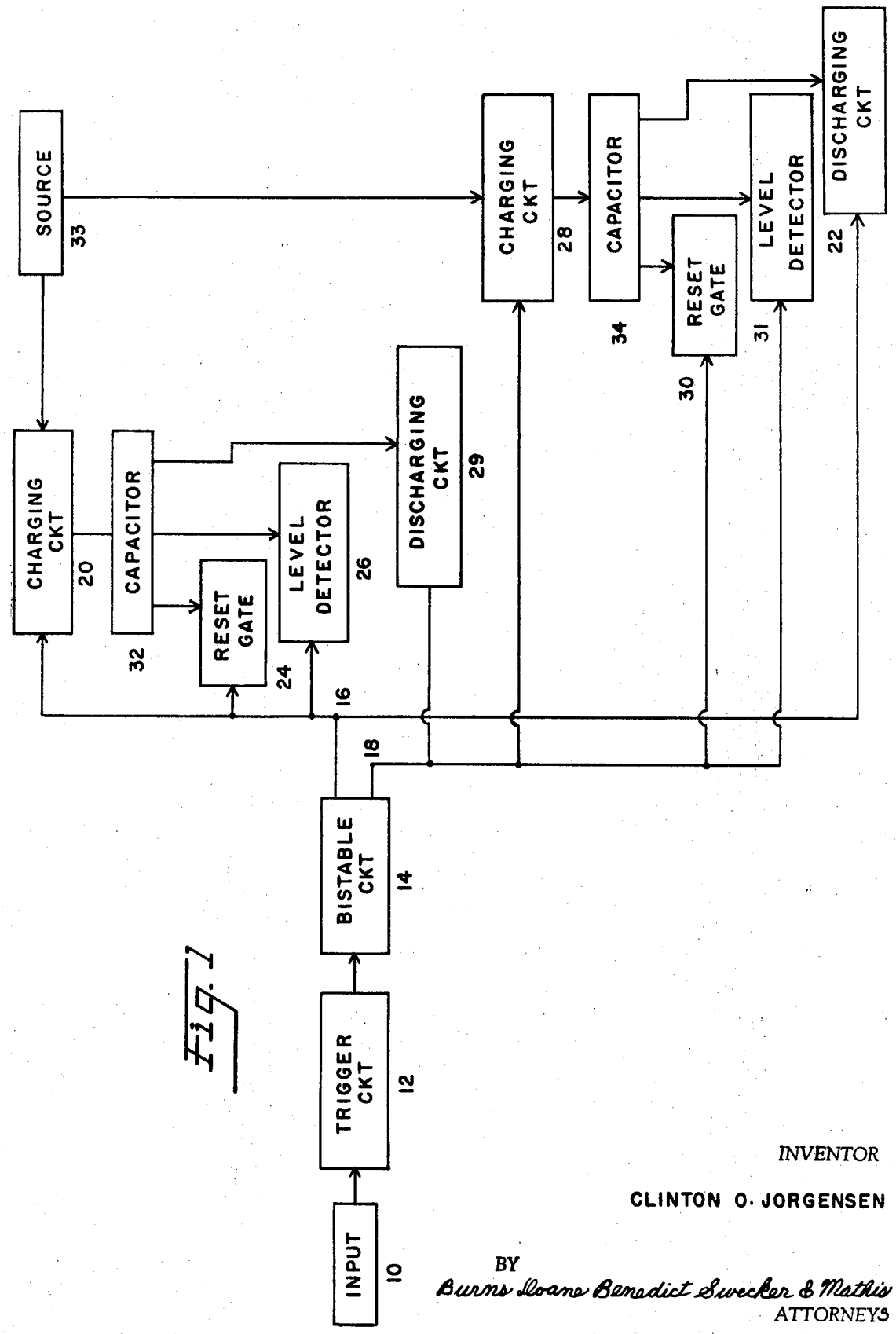
FIG. 1 is a simplified functional block diagram of the system of the invention.

The operation of the system is more easily explained with reference to the functional block diagram of FIG. 1 wherein an input from source 10 triggers, by means of trigger circuit 12, a bistable circuit 14. Bistable circuit 14 has two output terminals 16 and 18, the voltage at one terminal being "high" and the other terminal being "low" at all times and the states of both reversing each time the circuit is triggered by the output from trigger circuit 12.

Connected to terminal 16 is a charging circuit 20, a discharging circuit 22, a reset gate 24, and a level detector 26. Similarly connected to terminal 18 is a charging circuit 28, a discharging circuit 29, a reset gate 30 and a level detector 31.

Upon the occurrence of a triggering pulse which switches terminal 16 to its "high" state, reset gate 24 will completely discharge capacitor 32 and enable charging circuit 20 so that source 33 can begin to charge capacitor 32 anew. The charge on capacitor 32 is indicated in level detector 26 at the time that charge on the capacitor 32 is reset to zero. Discharging circuit 22 is also enabled and begins to slowly discharge capacitor 34.

Upon the occurrence of the next triggering pulse from trigger circuit 14 and the accompanying reversal of the outputs of terminals 16 and 18, charging circuit 20 will be deenergized. Terminal 18, now being in its "high" state, will activate discharging circuit 29 to commence the unidirectional discharging of capacitor 32. The charge on capaictor 32 will be a function of the duration of the preceding cardiac cycle, i.e. the length of time between triggering pulses. Discharging circuit 29 has the same rate as charging circuit 20 so that the charge remaining on capacitor 32 when bistable circuit 14 is next triggered will be representative of the difference between the periods of successive cardiac cycles.

Th "high" state of terminal 18 also causes the indication in level detector 31 of the charge remaining on capacitor 34 and completely discharges it by the enabling reset gate 30 so that a new unidirectional charging cycle may be begun.

Figure 2:
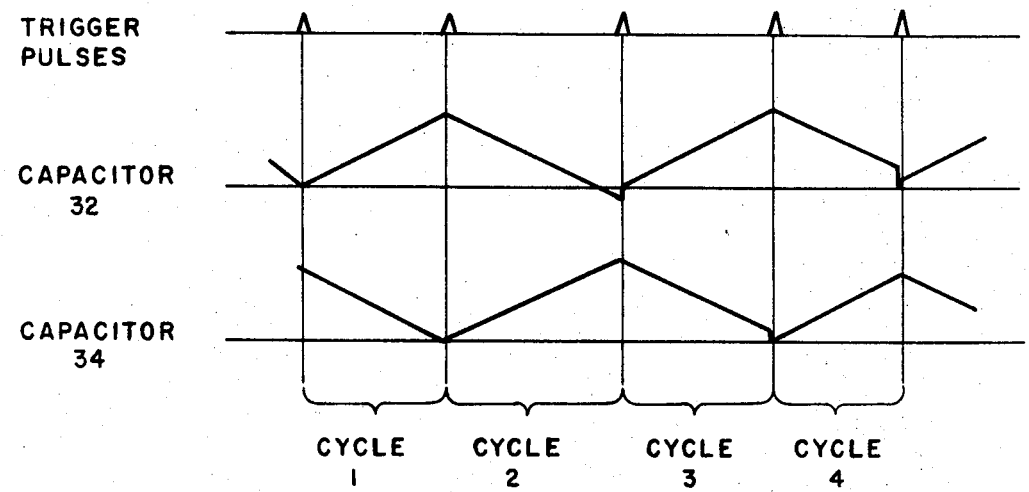
FIG. 2 is a graph showing the relationship of charge on the capacitors to the cardiac cycle trigger pulses.

Thus the difference between the period of the cardiac cycle just ending and the preceding cycle is indicated each time bistable circuit 14 is triggered. Reference may be had to FIG. 2 where it may be seen that a charge is accumulated on the capacitor 32 during cycle No. 1 and dissipated during cycle No. 2. Since cycle No. 2 is longer than cycle No. 1 in the example shown, the charge on capacitor 32 is negative on the occurrence of the third triggering pulse which resets or discharges the capacitor 32 for charging during cycle No. 3.

Capacitor 34 has been charging during the discharging of capacitor 32 and begins dissipating its charge during cycle No. 3. Since cycle No. 3 is shorter than cycle No.

2, the charge on capacitor 34 on the occurrence of the fourth triggering pulse is positive when the fourth pulse occurs.

Figure 3:
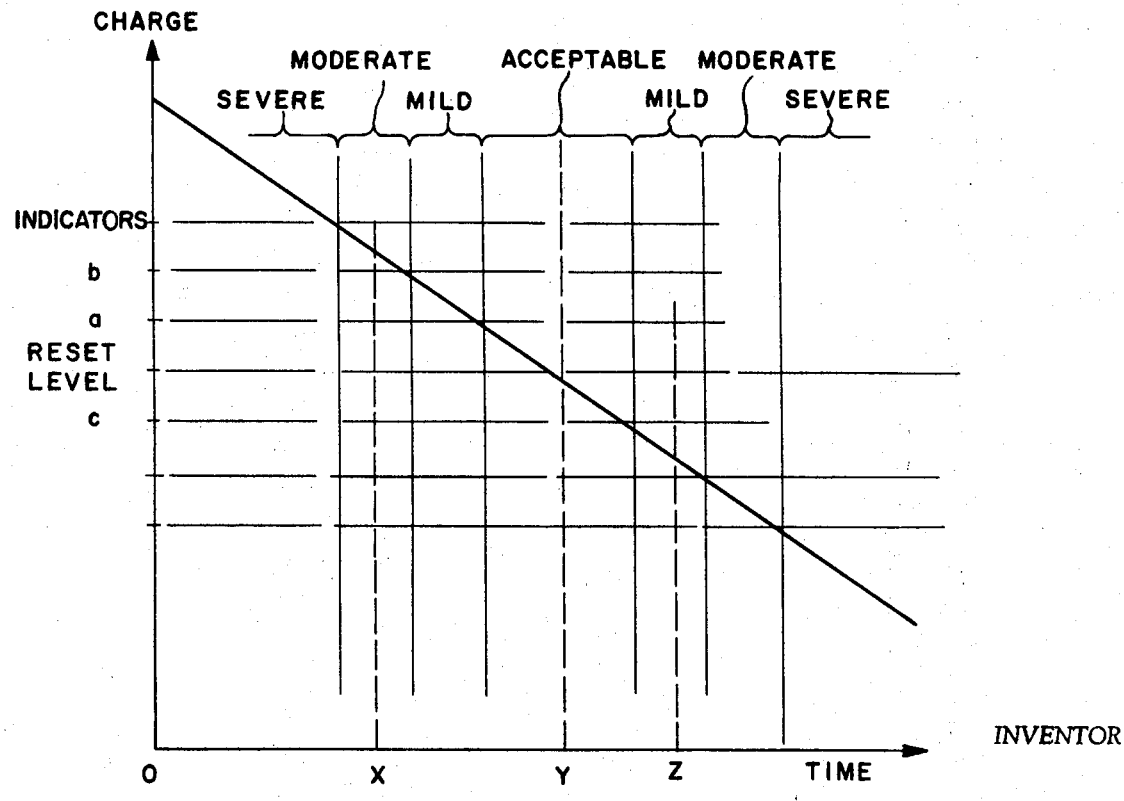
FIG. 3 is a graph showing the relationship of the capacitor charge level to the degree of arrhythmia.

An indication of the degree of arrhythmia is obtained through the use of level detection circuits the operation of which may be understood by reference to FIG. 3. In FIG. 3 it may be seen that the occurrence of a triggering pulse at point X in time will trip positive indicators *a* and *b*, while the occurrence at time Y will trip none of the indicators, and the occurrence at time Z will trip negative indicator *c* only. The actual operation of the level detector and indicator circuitry will be hereinafter explained in greater detail.

Figure 4:
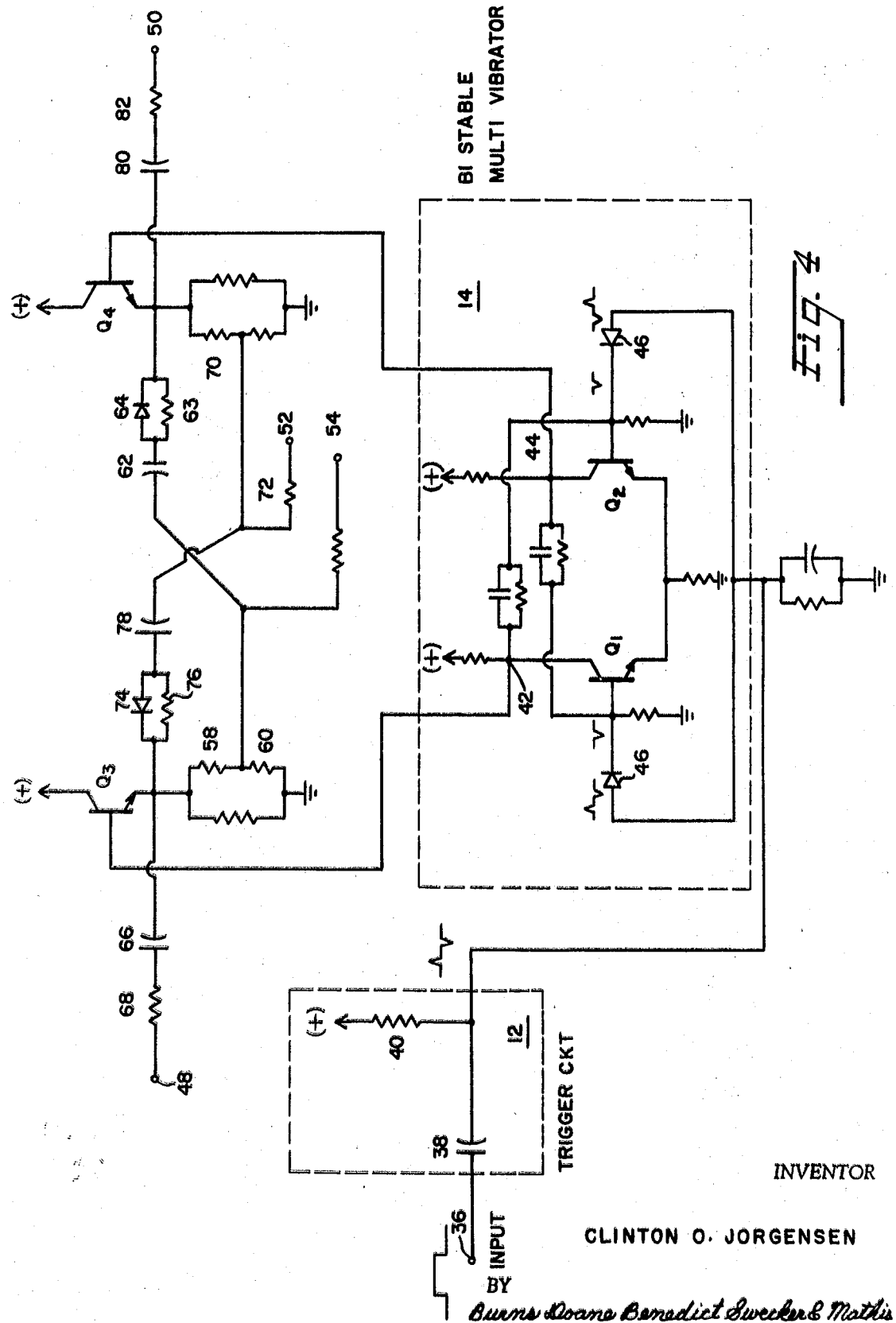
FIG. 4 is a schematic diagram of the trigger and bistable circuits indicated in block form in FIG. 1.

Referring now to FIG. 4, a positive input pulse is applied to input terminal 36. This input pulse may be derived from any portion of the cardiac cycle but must be consistently derived from the same portion of the cycle irrespective of the shape of the waveform and rate of recurrency. The positive input pulse is differentiated by capacitor 38 and resistor 40 which together comprise trigger circuit 12. The output of the trigger circuit 12 is in the form of a positive and a negative spike corresponding to the leading and trailing edges of the input pulse and is fed to a bistable multivibrator 14.

Bistable multivibrator 14 is entirely conventional in its operation with the two outputs taken respectively from terminals 42 and 44 of NPN transistors Q1 and Q2. The potential of output terminals 42 and 44 reverses in response to each application to the base electrodes of transistors Q1 and Q2 of the negative spike of the output of the trigger circuit 12, the positive spike being blocked by diodes 46.

The outputs of multivibrator 14 are fed respectively to the base electrodes of NPN transistors Q3 and Q4 to drive a network of resistors and capacitors in their respective emitter circuits to provide outputs at terminals 48, 50, 52 and 54.

In explaining the operation of the circuit, let us assume that multivibrator 14 has been previously triggered to, or has assumed upon energization of the circuit, a condition such that the collector of transistor Q1 is in its "low" or conducting state and that the collector of transistor Q2 is in its "high" or non-conducting state. Let us further assume that transistor Q3 is in cutoff and that transistor Q4 is in saturation in response to the multivibrator 14 outputs as taken from terminals 42 and 44 and applied to their respective base electrodes.

The triggering of multivibrator 14 reverses the potential of output terminals 42 and 44 and the state of conduction of transistors Q3 and Q4. The positive potential from terminal 42 is applied to the base electrode of NPN transistor Q3 driving transistor Q3 into saturation raising the emitter potential and the potential at the resistor 58 and 60 junction and thus the potential at terminal 54. The rise in potential at terminal 54 is opposed for a brief period by the negative going potential of the emitter of transistor Q4 which results from the cutoff of transistor Q4 in response to the reduced potential at terminal 44. This opposition to the rise of potential at terminal 54 is limited to the time required to charge capacitor 62 and is approximately 5 milliseconds in the preferred embodiment disclosed, current limiting resistor 63 being shunted by diode 64.

The rise in the emitter potential of transistor Q3 is immediately reflected in the potential at terminal 48 as a positive pulse. The duration of the pulse is a function of the time required to charge capacitor 66, i.e. the values of capacitor 66 and resistors 68 and 69 (FIG. 5), and is approximately 3 milliseconds in the preferred embodiment disclosed.

As earlier mentioned, the emitter potential of transistor Q4 drops with the transition of transistor Q4 from saturation into cutoff. The negative going potential of the emitter of transistor Q4 is passed through resistors 70 and 72 to terminal 52. The effect of the rising emitter potential of transistor Q3 on the potential of terminal 52 is negligible due to the polarity of diode 74 which forces the charging current through current limiting resistor 76.

Figure 5:
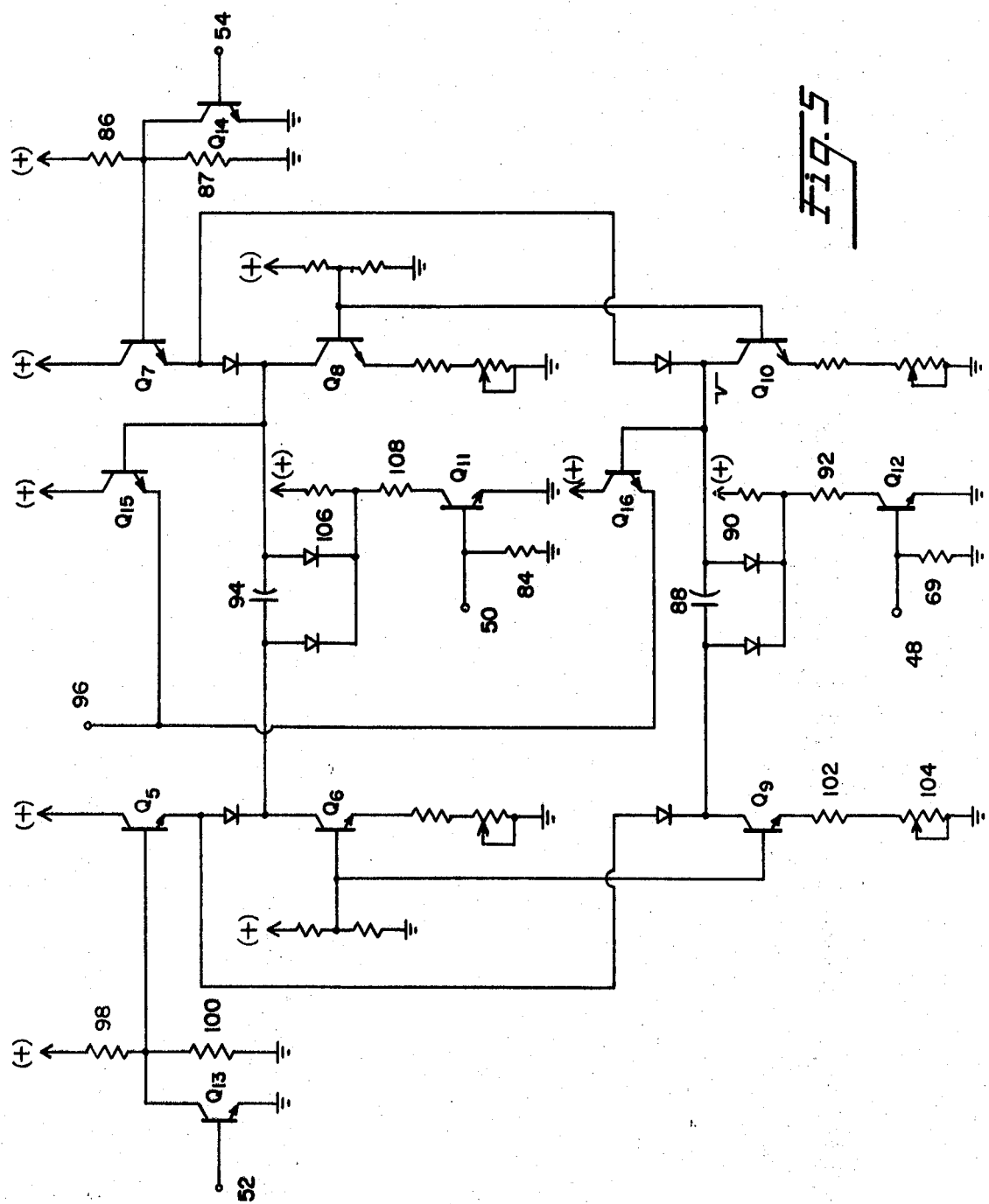
FIG. 5 is a schematic diagram of the capacitor charging and discharging circuits.

The negative going potential at the emitter of transistor Q4 is passed to terminal 50 in the form of a negative pulse the duration of which is determined by the charging of capacitor 80, i.e. the values of capacitor 80 and resistors 82 and 84 (FIG. 5.)

The triggering of multivibrator 14 thus results in the application of a negative pulse to terminal 50, a positive pulse to terminal 48, an immediate negative potential at terminal 52 and a slightly delayed positive potential at terminal 54

Referring now to FIG. 5 where the same designation of terminals 48, 50, 52 and 54 has been retained, the delayed positive potential applied to terminal 54 is applied to the base electrode of NPN transistor Q14 driving it into saturation thereby clamping the resistor 86 and 87 junction to a potential near ground and driving NPN transistor Q7 into cutoff.

The positive pulse applied to terminal 48 drives NPN transistor Q12 into saturation for the duration of the pulse thereby discharging capacitor 88 through diodes 90, resistor 92 and the emitter-collector path of transistor Q12.

The negative pulse applied to terminal 50 and the base of NPN transistor Q11 maintains it in cutoff.

The negative potential applied to terminal 52 drives NPN transistor Q13 into cutoff raising the potential at the resistor 98 and 100 junction and driving NPN transistor Q5 into conduction' Since transistors Q6 and Q8 are both conducting, capacitor 94 is charged through the emitter-collector paths of transistors Q5 and Q8. Similarly, capacitor 88 is charged through transistors Q5 and Q10.

At the end of a given cardiac cycle, i.e. when the next trigger pulse is applied to multivibrator 14, capacitors 88 and 94 will have been charged to a voltage which is directly proportional to the time elapsed since the last trigger pulse. Transistors Q6, Q8, Q9 and Q10 have substantially the same charging rate which is maintained sufficiently low with respect to the size of their respective capacitors 88 and 94 such that the capacitors 88 and 94 will never reach saturation on even the longest cardiac cycle.

The negative pulse applied to terminal 48 and the base electrode of NPN transistor Q12 maintains it in cutoff. Any charge accumulated on capacitor 88 thus remains until discharged through the emitter-collector path of transistor Q9 and resistors 102 and 104.

The charge on capacitor 94 determines the potential at the base electrode of NPN transistor Q15 and thus the emitter potential which controls the output at terminal 96 relative to the potential at the collector of Q6.

Upon receipt of the next negative trigger pulse from trigger circuit 12, bistable multivibrator 14 reverses the potential of output terminals 42 and 44. In the manner previously explained with respect to the preceding triggering of multivibrator 14, reversing the potential on the base electrodes of transistors Q3 and Q4 provides a positive pulse at terminal 50 and a negative pulse at terminal 48, both pulses being of approximately 3 milliseconds duration. It further applies a negative potential to terminal 54 and a positive potential to terminal 52 after a delay of approximately 5 milliseconds.

As a result of the negative pulse applied to terminal 48, transistor Q12 remains in cutoff allowing the charge remaining on capacitor 88 to control the potential at output terminal 96 by controlling the conduction of NPN transistor Q16.

The positive pulse applied to terminal 50 drives transistor Q11 into saturation discharging capacitor 94 through diodes 106, resistor 108, and the emitter-collector path of Q11.

The delayed positive potential applied to terminal 52 drives transistor Q13 into saturation and transistor Q5 into cutoff by lowering the potential at the resistor 98 and 100 junction.

The negative potential to terminal 54 drives transistor Q14 into cutoff raising the potential of the resistors 86 and 87 junction and driving transistor Q7 into conduction. As a result, capacitor 94 is charged through transistors Q7 and Q6 and capacitor 88 through transistors Q7 and Q9.

Thus upon every reversal of the outputs of multivibrator 14, i.e. once each cardiac cycle, the charge remaining on one capacitor is read and the capacitor reset or completely discharged and the charging of the other capacitor is reversed. Upon the occurrence of the next triggering pulse the effects are reversed.

Since the charge accumulated on a capacitor during one cycle is drained off at the same rate during the next cycle, the charge remaining on that capacitor when triggered at the beginning of the third cycle represents the difference in the periods of successive cycles. The amplitude of that charge is determined in indicator circuitry in a manner to be hereinafter described.

Figure 6:
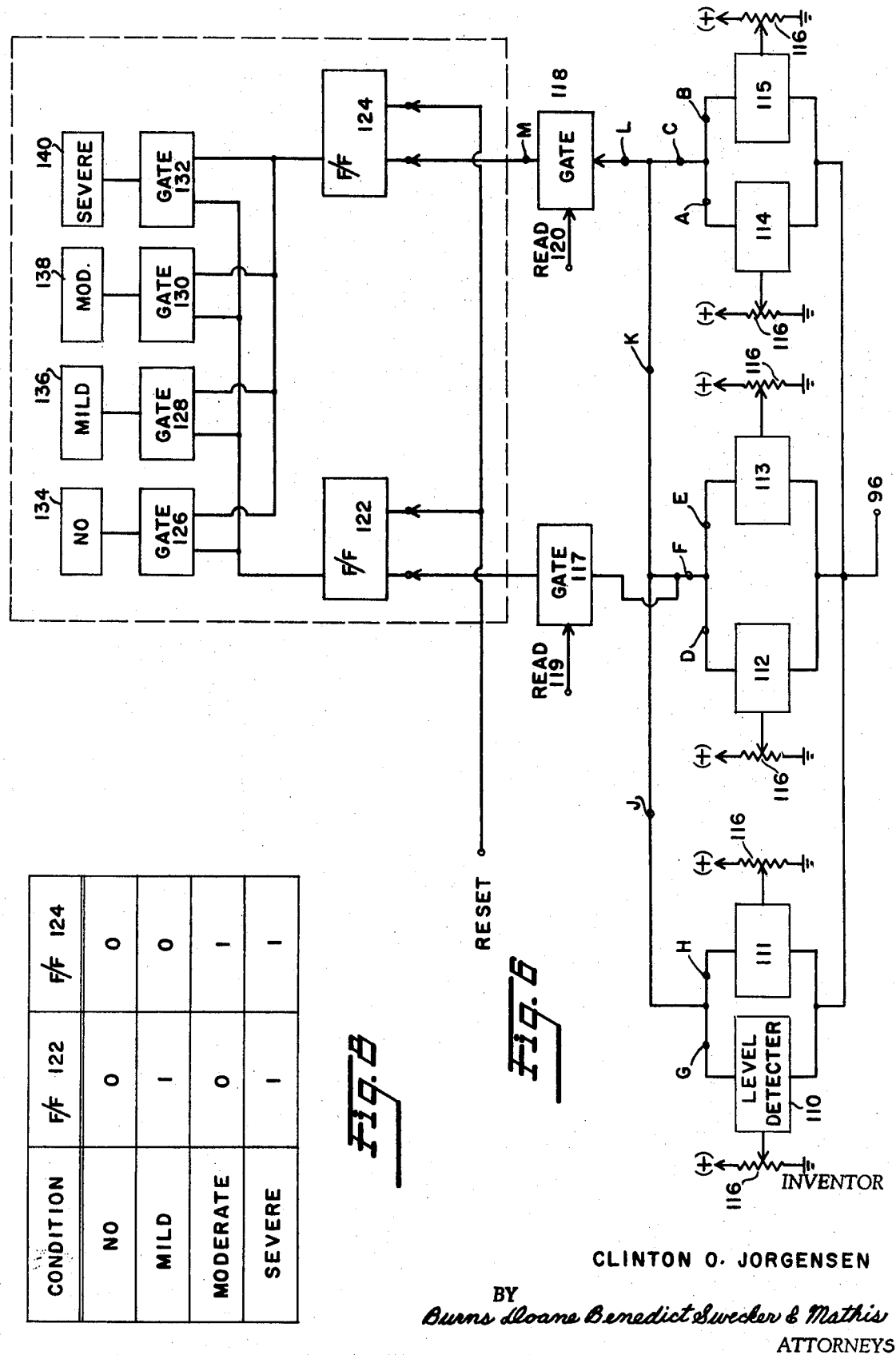
FIG. 6 is a block diagram of the level detector and indicator circuits.
Figure 7:
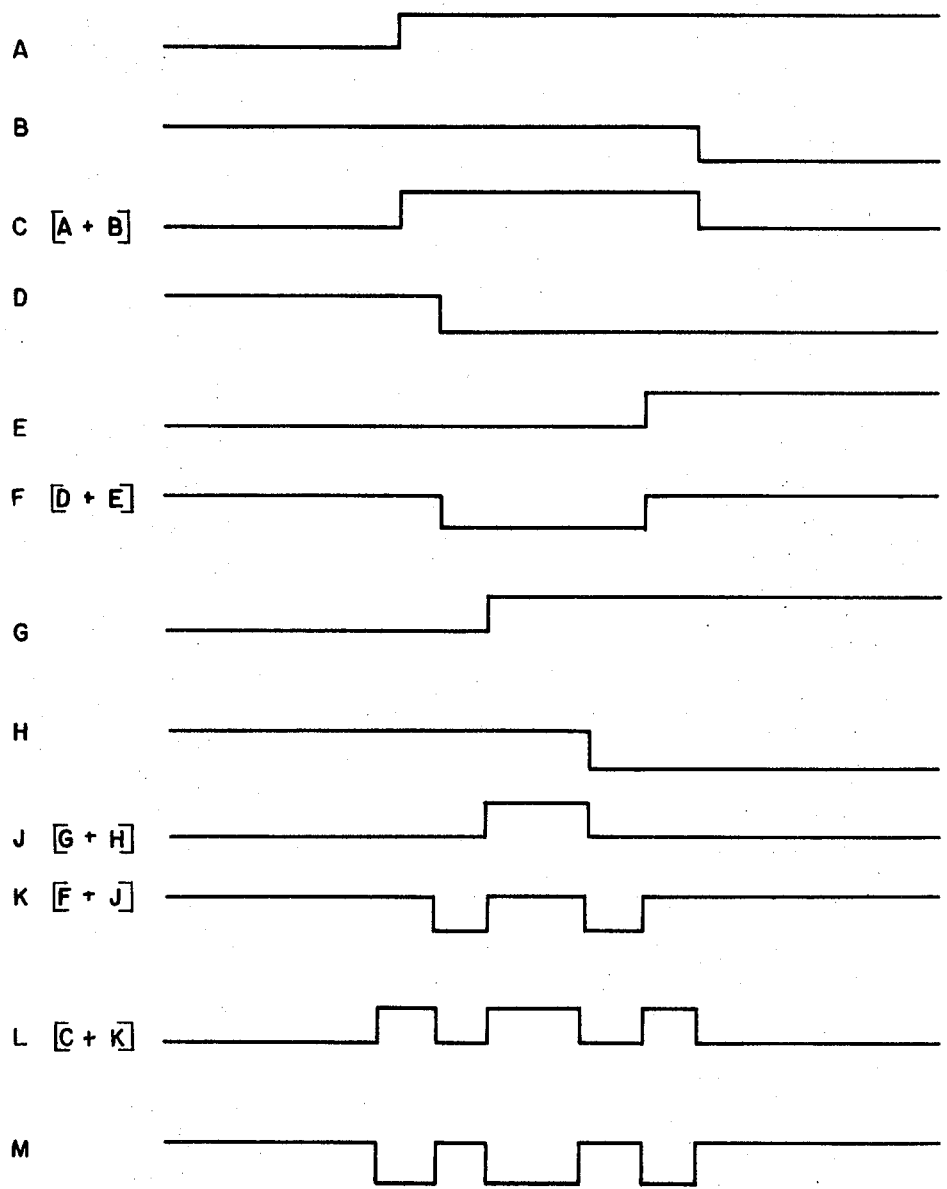
FIG. 7 is a plot of voltage waveforms of the level detector circuits of FIG. 6.

Referring now to FIG. 6, the output of the circuit shown in FIG. 5 is applied by way of terminal 96 to the six level detectors 110–115 shown in block form. The bias on each of the level detectors 110–115 may be individually adjusted to the values indicated on the ordinate of the graph shown in FIG. 3 by adjusting the appropriate potentiometers 116. The outputs of the level detectors 110–115 are simple positive or negative step voltages which are combined as indicated in the drawings to provide the inputs to gates 117 and 118. The shape of the waveforms existing at points A–H and J–M are indicated in FIG. 7.

A read pulse is derived from the original input pulse to the trigger circuit 12 of FIG. 4 and is applied to terminals 119 and 120 respectively of gates 117 and 118. The potential passed through gate 117 on the occurrence of the enabling read pulse at terminal 119 is dependent upon the value of the waveform F of FIG. 7. Similarly, the potential passed through gate 118 on the enabling thereof is determined by the shape of waveform L of FIG. 7.

The outputs of gates 117 and 118 are fed respectively to conventional binary or flip-flop circuits 122 and 124 the outputs of which are fed to logic gates 126, 128, 130 and 132. The outputs of the respective gates are used to energize indicators 134, 136, 138 and 140 to indicate respectively the conditions of no arrhythmia, mild arrhythmia, moderate arrhythmia and severe arrhythmia.

The circuitry of the binary or flip-flop circuits 122 and 124 and of the logic gates 126–132 and indicators 134–140 is entirely conventional, operating in a manner well known in the art, and comprises no part of the present invention. The table shown in FIG. 8 illustrates the manner in which the four possible permutations of the two binary signals appearing at the outputs of binary circuits 122 and 124 may be used to energize the appropriate indicators.

Referring now to FIG. 9 for the circuitry by which waveforms A, B, D, E, G and H are generated and combined to ultimately form the waveforms F and L applied to gate 117 and 118, the application of a positive potential to terminal 96 and the base electrode of NPN transistors 142, 143 and 144 respectively of level detectors 114, 113 and 110 will drive the respective transistors into saturation at a level dependent upon the bias supplied by the appropriate potentiometer 116 to NPN transistors 145, 146 and 147.

In a similar manner, potentiometers 116 are adjusted so that NPN transistors 148, 150 and 152 of respective level detectors 115, 112 and 111 will remain in cutoff until the potential applied to their respective emitters becomes sufficiently negative to drive the minto saturation. Since the emitter potential of transistors 148, 150 and 152 is controlled by the conduction of NPN transistors 154, 156 and 158, the base electrodes of which are connected to terminal 96, a negative going output of the circuit of FIG. 5 will drive transistors 154, 156 and 158 into cutoff, and transistors 148, 150 and 152 into saturation.

The waveforms A and B which appear at the output of level detectors 114 and 115, i.e. the collector voltages of transistors 142 and 148, are combined at terminal 160 to form waveform C. Similarly, waveforms D and E are combined at terminal 162 to form waveform F as are waveforms G and H at terminal 164 to form waveform J.

Waveform F is fed directly to the base electrode of NPN transistor 166 to control the conduction thereof and, on the occurrence of the read pulse applied to terminal 118, the conduction of NPN transistor 168. The output of transistor 168 is taken from the collector electrode and fed to terminal 169 at the input to binary circuit 122 of FIG. 6.

Waveforms J and F are combined at terminal 170 to produce waveform K which is in turn combined with waveform C at terminal 172 to produce waveform L. Waveform L is applied to the base electrode of NPN transistor 174 to control the conduction thereof and the conduction of NPN transistor 176. Since the output of transistor 176 is taken from the collector electrode, the waveform M appearing there is a mirror image of waveform L.

Waveform M controls the conduction of NPN transistor 178 upon the occurrence of a read pulse at terminal 120 of gate 118 and thus the potential of terminal 180 at the input to binary circuit 124 of FIG. 6.

The operation of the foregoing circuits has been explained. The detector is unique in being applicable over a substantially unlimited average frequency range to detect relative variation in length of adjacent cycles regardless of the absolute cycle duration. It is therefore particularly applicable to detection of cardiac arrhythmia, which may be present at any heart rate. Heart rates vary over a wide range, from less than 40 to over 140 per minute.

It is to be understood that the subject invention is not to be limited in scope to the particular circuitry disclosed. A portion or all of the NPN transistors shown may be replaced by transistors having opposite conductivity with appropriate modifications in the bias potentials. Numerous other modifications will suggest themselves to one skilled in the art to which this invention pertains. The scope of the present invention is intended to encompass such modifications and is to be limited only by the application of a broad range of equivalents to the language of the appended claims.

What is claimed is:

1. The method of evaluating an electrical signal comprising periods variable in both recurrency and waveform characteristics comprising the steps of:
    (a) detecting a portion of the signal in substantial uniform time phase relation to each of the periods,
    (b) generating an electrical waveform in response to said detection,
    (c) sampling said generated waveform, and
    (d) generating an electrical signal if the value of said sampled waveform is within a predetermined range.

2. The method of claim 1 wherein said waveform is generated every second detection and is terminated upon the next succeeding detection and including the steps of integrating said waveform, generating a second waveform in response to said next succeeding detection, terminating said second waveform upon every second detection, integrating said second waveform and comparing the integral of said waveforms after an even number of periods prior to sampling.

3. The method of claim 2 wherein the number of periods prior to sampling before comparing the integral of said waveforms is two.

4. The method of claim 3 including the step of returning the integral of said waveforms to zero upon each sampling.

5. The method of claim 4 wherein said waveforms are linear with respect to time.

6. The method of evaluating an electrical signal comprising periods variable in both recurrency and waveform characteristics comprising the steps of:
(a) detecting a portion of the signal in substantial uniform time phase relation to each of the periods,
(b) charging a capacitor during one of the periods,
(c) discharging said capacitor during a subsequent one of the periods, and
(d) measuring the charge remaining on said capacitor upon the termination of said subsequent period.

7. The method of claim 6 wherein the rates of charging and discharging said capacitor are substantially equal.

8. The method of claim 7 wherein the charging and discharging of said capacitor are linear with respect to time.

9. The method of claim 6 wherein the charge remaining on said capacitor is measured by a plurality of binary output level detectors.

10. The method of claim 6 including the steps of charging a second capacitor during the periods when said first-mentioned capacitor is discharging, discharging said second capacitor during the periods when said first-mentioned capacitor is charging, and measuring the charge remaining on said second capacitor upon the termination of said one period.

11. The method of claim 10 wherein the rate of charging and discharging said capacitors is substantially the same.

12. The method of claim 11 wherein the rates of charging and discharging said capacitors is linear with respect to time.

13. The method of evaluating an electrical signal having periods variable in both recurrency and waveform characteristics comprising the steps of:
(a) detecting a portion of the signal in substantial uniform time phase relation to each of the periods,
(b) measuring the time between successive detections to define successive periods of the signal, and
(c) electrically comparing each of the defined periods with the immediately preceding period.

14. The method of claim 13 including the further step of generating an electrical signal if the difference between successive periods is within a predetermined range.

15. A detector for arrhythmia of an electrical signal having cyclical periods variable in both recurrency and waveform characteristics comprising:
means for detecting a portion of one of the cyclical periods of the signal;
means responsive to the detection of said portion for generating a unidirectional waveform having an initial amplitude dependent upon the time elapsed since the preceding detection of a like portion of the signal, and
signal generating means responsive to the next subsequent detection by the detection means and the amplitude of the generated waveform whereby said signal generating means is operative in dependency on the relative elapsed times between the first and second, and second and third, detections.

16. A detector for arrhythmia of an electrical signal having cyclical periods variable in both recurrency and waveform characteristics comprising:
means for detecting a portion of one of the cyclical periods of the signal;
means responsive to the detection of said portion for generating a unidirectional waveform having an initial amplitude dependent upon the time elapsed since a previous detection of a like portion of the signal.
means responsive to the subsequent detection of a like portion of another of said cyclical periods for sampling the amplitude of said generated waveform; and
means for indicating the amplitude of the waveform sampled.

17. The detector of claim 16 wherein the initial amplitude of said generated waveform is of a polarity opposite to the polarity of said generated waveform.

18. The detector of claim 17 wherein said generated waveform is linear with respect to time.

19. The detector of claim 18 wherein said means for indicating the amplitude of the waveform sampled includes a plurality of bistable level detectors and means responsive to said level detectors for selectively energizing a plurality of indicators.

20. A detector for arrhythmia of an electrical signal having cyclical periods variable in both recurrency and waveform characteristics comprising:
a capacitor,
means for charging said capacitor during a first period of said signal,
means for discharging said capacitor during a second period of said signal, and
means for indicating the charge on said capacitor upon the termination of said second period.

21. The detector of claim 20 further comprising:
means operative to reset the final charge on said capacitor to its value at the start of the first period.

22. The detector of claim 20 wherein said means for indicating the charge on said capacitor includes a plurality of individually adjustable level detectors.

23. The detector of claim 20 wherein said capacitor is charged and discharged at substantially the same rate.

24. The detector of claim 20 including
means for charging said second capacitor,
a second capacitor,
means for discharging said second capacitor,
means for indicating the charge on said second capacitor, and
means for coordinating the charging of said second capacitor with the discharging of said first-mentioned capacitor and the discharging of said second capacitor with the charging of said first-mentioned capacitor.

25. The detector of claim 24 wherein said capacitors are charged and discharged at substantially the same rate.

References Cited

UNITED STATES PATENTS

| | | | |
|---|---|---|---|
| 2,536,527 | 1/1951 | Appel | 128—2.05 |
| 2,919,402 | 12/1959 | Hanlet et al. | 324—78 |
| 3,229,687 | 1/1966 | Halter | 128—2.06 |
| 3,267,934 | 8/1966 | Thornton | 128—2.06 |
| 3,351,939 | 11/1967 | Olsen et al. | |
| 3,368,149 | 2/1968 | Wasserman | 324—111 X |
| 3,398,366 | 8/1968 | Apfelbeck | 324—78 |
| 3,398,736 | 8/1968 | Brant et al. | 128—2.05 |

WILLIAM E. KAMM, Primary Examiner

U.S. Cl. X.R.

324—78, 111

PO-1050
(5/69)

UNITED STATES PATENT OFFICE
CERTIFICATE OF CORRECTION

Patent No. 3,518,983          Dated July 7, 1970

Inventor(s)  C. O. Jorgensen

It is certified that error appears in the above-identified patent and that said Letters Patent are hereby corrected as shown below:

IN THE SPECIFICATION:

Col. 1, line 41, delete "protected" and substitute --protracted--.

Col. 1, line 60, delete "and" and substitute --an--.

Col. 2, line 48, delete "capaictor" and substitute --capacitor--.

Col. 2, line 55, delete "Th" and substitute --The--.

Col. 5, line 71, delete "the minto" and substitute --them into--.

IN THE CLAIMS:

Col. 8, line 38, delete "means for charging said second capacitor," and insert between lines 39 and 40.

SIGNED AND
SEALED
SEP 29 1970

(SEAL)
Attest:

Edward M. Fletcher, Jr.
Attesting Officer

WILLIAM E. SCHUYLER, JR.
Commissioner of Patents